United States Patent
Koerber et al.

(10) Patent No.: US 7,437,740 B1
(45) Date of Patent: Oct. 14, 2008

(54) GENERATION OF JAVA LANGUAGE APPLICATION PROGRAMMING INTERFACE FOR AN OBJECT-ORIENTED DATA STORE

(75) Inventors: Paul Donald Koerber, Laguna Hills, CA (US); Avinash Sadhu, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 669 days.

(21) Appl. No.: 10/636,924

(22) Filed: Aug. 6, 2003

Related U.S. Application Data (63) Continuation-in-part of application No. 10/306,604, filed on Nov. 26, 2002, now Pat. No. 7,155,700, and a continuation-in-part of application No. 10/306,602, filed on Nov. 26, 2002, now Pat. No. 7,174,348, and a continuation-in-part of application No. 10/306,601, filed on Nov. 26, 2002, now Pat. No. 7,159,206.

(60) Provisional application No. 60/456,376, filed on Mar. 20, 2003.

(51) Int. Cl.
G06F 13/00 (2006.01)
(52) U.S. Cl. .............................. 719/330; 719/328; 718/1
(58) Field of Classification Search .................. 719/328, 719/330; 718/1
See application file for complete search history.

(56) References Cited

U.S. PATENT DOCUMENTS 5,889,992 A * 3/1999 Koerber ...................... 717/108
6,308,164 B1 * 10/2001 Nummelin et al. ............. 705/9
6,789,077 B1 * 9/2004 Slaughter et al. ............. 707/10
6,934,709 B2 * 8/2005 Tewksbary ................... 707/10
2002/0049788 A1 * 4/2002 Lipkin et al. ................ 707/513
2004/0139157 A1 * 7/2004 Neely et al. ................. 709/205
2005/0039190 A1 * 2/2005 Rees et al. .................. 719/316

OTHER PUBLICATIONS

Stuart Dabbs Halloway. "Component Development for the Java Platform." Addison Wesley Professional, Dec. 14, 2001. "Chapter 6.1: Why Interoperate?"*
Stuart Dabbs Halloway. "Component Development for the Java Platform." Addison Wesley Professional, Dec. 12, 2001.*
Steflik, Dick and Sridharan, Prashant. Advanced Java Networking. Upper-Saddle River, NJ: Prentice-Hall, Inc., 2000.*
Avi Sadhu, Unisys Corporation, Rein in That Monster Of A Process With Modern Web-Based Tools, Project World Conference, San Jose, California, Dec. 13, 2001.

* cited by examiner

*Primary Examiner*—Andy Ho
(74) *Attorney, Agent, or Firm*—James E. Goepel; Phuong-Quan Hoang; Robert P. Marley (57) ABSTRACT

An embodiment of the present invention is a technique to interface to a repository. A connection between a client and a repository database is established. The repository database has a repository application programming interface (API). The repository database contains objects related to a project management process. The repository API is communicated with to perform an operation based on parameters passed from the client via the connection. A return value associated with the operation is returned to the client.

30 Claims, 9 Drawing Sheets

GENERATION OF JAVA LANGUAGE APPLICATION PROGRAMMING INTERFACE FOR AN OBJECT-ORIENTED DATA STORE

CROSS-REFERENCE TO RELATED APPLICATIONS

This application is a continuation-in-part application of the following patents: "Creating Customized Objects For Processes In Project Management", Ser. No. 10/306,604, filed on Nov. 26, 2002, now U.S. Pat. No. 7,155,700; "Automated Process Execution For Project Management", Ser. No. 10/306,601, filed on Nov. 26, 2002, now U.S. Pat. No. 7,159,206; and "Collaborating Activities Using Customized Objects For Project Management", Ser. No. 10/306,602, filed on Nov. 26, 2002, now U.S. Pat. No. 7,174,348. This application claims the benefit of the provisional application entitled "Project Management Using Customized Objects", Ser. No. 60/456,376 filed on Mar. 20, 2003, and is related to the following patents and patent applications: Ser. No. 10/636,959 entitled "Capturing Traceability Information Between Artifacts Produced By A Project Management Software"; Ser. No. 10/636,955 entitled "Instantiating A Project In A Project Management System"; Ser. No. 10/636,923 entitled "Automating Document Reviews In A Project Management System", now U.S. Pat. No. 7,302,674; Ser. No. 10/636,961 entitled "Implementing Web-Based Wizards In Distributed Web Applications"; Ser. No. 10/636,962 entitled "Implementing Complex Client-Side Graphical User Interface Controls In Distributed Web Applications"; Ser. No. 10/636,951 entitled "Synchronizing Data Between A Data Store And A Project Management Client Tool"; Ser. No. 10/636,852 entitled "Tracking Status Of Task In A Project Management Tool"; Ser. No. 10/636,953 entitled "Customizing And Automating Checklists In Project Management"; Ser. No. 10/636,952 entitled "Controlling Access To Projects In A Project Management System"; Ser. No. 10/636,945 entitled "Customizing And Automating Entry And Exit Criteria In A Project Management System"; Ser. No. 10/636,946 entitled "Sending Notifications To Project Members In A Project Management System", all filed on the same date and assigned to the same assignee as the present application, the contents of each of which are herein incorporated by reference.

BACKGROUND

1. Field of the Invention

Embodiments of the invention relate to the field of management software, and more specifically, to project management.

2. Description of Related Art

Project management is becoming more and more complex. In enterprise applications, the sizes of projects are typically quite large, including complex databases and involving a large number of participants. The complex interactions among the various team members, process flows, tools, and databases have created difficulties to project managers. The project manager has to keep track of the progress of the project, communicate with stake holders, during the initiation, planning, executing, controlling, and closing phases of a project. Team members have to use the tools of the trade, exchange ideas, generate and review project documentations and/or reports, update information, communicate with the project manager regarding progress of their work, etc.

Existing techniques for project management have a number of drawbacks. First, most traditional techniques are not convenient to users or team members because of lack of support and/or interface to Web-based information sharing. Second, the project information may not be well structured or organized. Users do not have a common format or platform to organize data or information and trace sources of data and information. Third, workflow/process automation is non-existent.

An application programming interface (API) for a database used for such a project management system may also present many difficulties. Java has become a popular programming language for enterprise business applications. However, not all API's are for clients written in Java. When the database or data store is designed with other languages such as object-oriented languages (e.g., C++), the interface between the clients and the data store may have problems. Two possible solutions include using Remote Procedure Calls (RPC) and Simple Object Access Protocol (SOAP). However, these techniques are inefficient to open and close the repository on each call.

SUMMARY OF THE INVENTION

An embodiment of the present invention is a technique to interface to a repository. A connection between a client and a repository database is established. The repository database has a repository application programming interface (API). The repository database contains objects related to a project management process. The repository API is communicated with to perform an operation based on parameters passed from the client via the connection. A return value associated with the operation is returned to the client.

BRIEF DESCRIPTION OF THE DRAWINGS

The invention may best be understood by referring to the following description and accompanying drawings that are used to illustrate embodiments of the invention. In the drawings.

DESCRIPTION

An embodiment of the present invention is a technique to interface to a repository. A connection between a client and a repository database is established. The repository database has a repository application programming interface (API). The repository database contains objects related to a project management process. The repository API is communicated with to perform an operation based on parameters passed from the client via the connection. A return value associated with the operation is returned to the client.

In the following description, numerous specific details are set forth. However, it is understood that embodiments of the invention may be practiced without these specific details. In other instances, well-known circuits, structures, and techniques have not been shown in order not to obscure the understanding of this description.

Figure 1A:
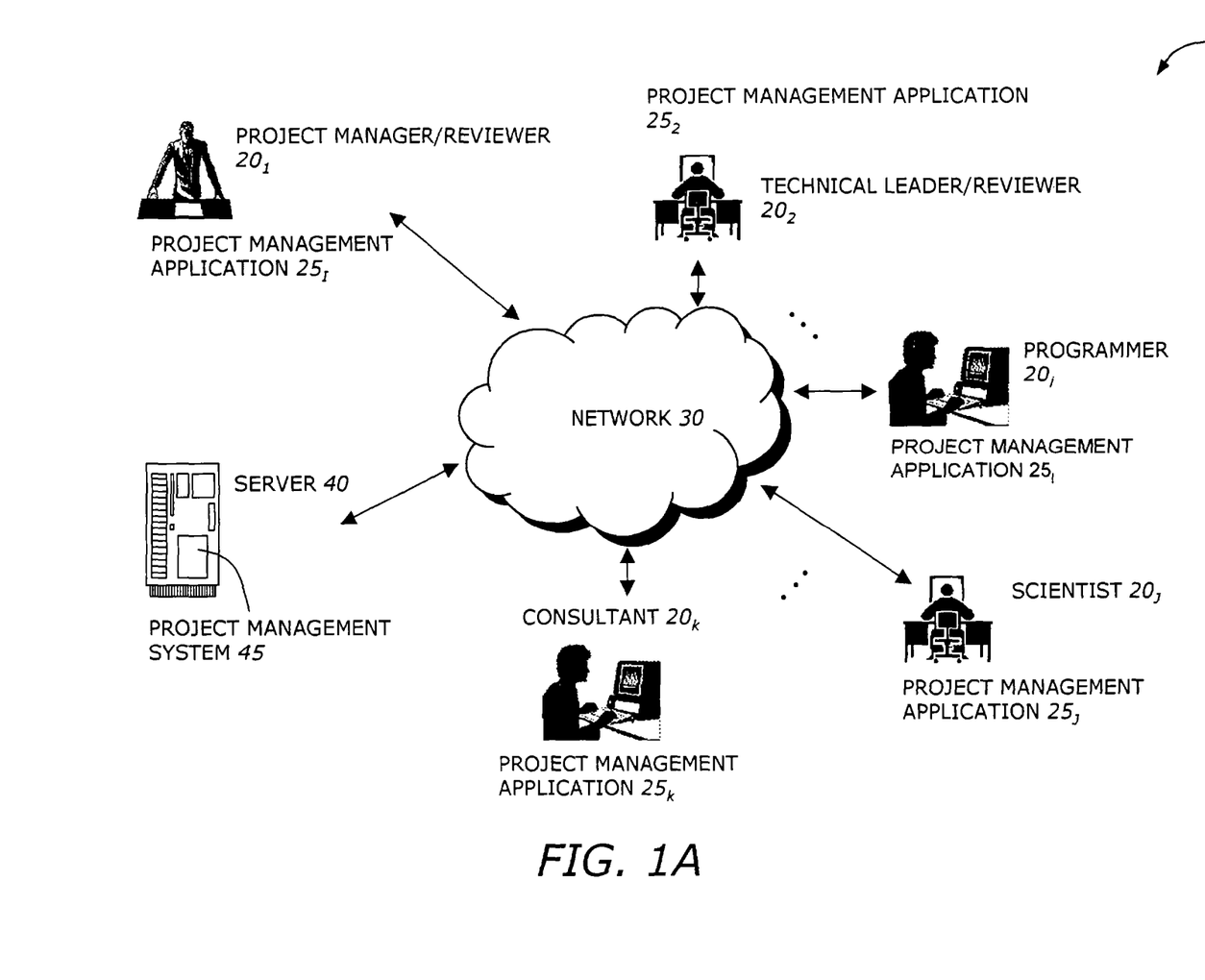
FIG. 1A is a diagram illustrating a project environment in which one embodiment of the invention can be practiced.

FIG. 1A is a diagram illustrating a project environment 10 in which one embodiment of the invention can be practiced. The project environment 10 includes project members $20_1$ to $20_K$, a network 30, and a server 40.

The project members may include a project manager $20_1$, a technical leader $20_2$, a programmer $20_i$, a scientist $20_j$, and a consultant $20_K$. A person may have one or more roles. Each member may be assigned one or more tasks in one or more phases of a project. Each member has access to a project management application $25_i$ to $25_K$, respectively. The project management application may be located in the computer used by the member.

The network 30 may be any suitable network that links the project members $20_1$ to $20_K$. The network 30 may be an Internet, intranet, extranet, wireless fidelity (Wi-Fi), local area network (LAN), wide area network (WAN), etc. The network 30 allows project members to communicate with each other and to access the project management application. The server 40 is connected to the network 30 and contains a project management system 45 that provides the tools for users to construct, create, or instantiate a project.

Figure 1B:
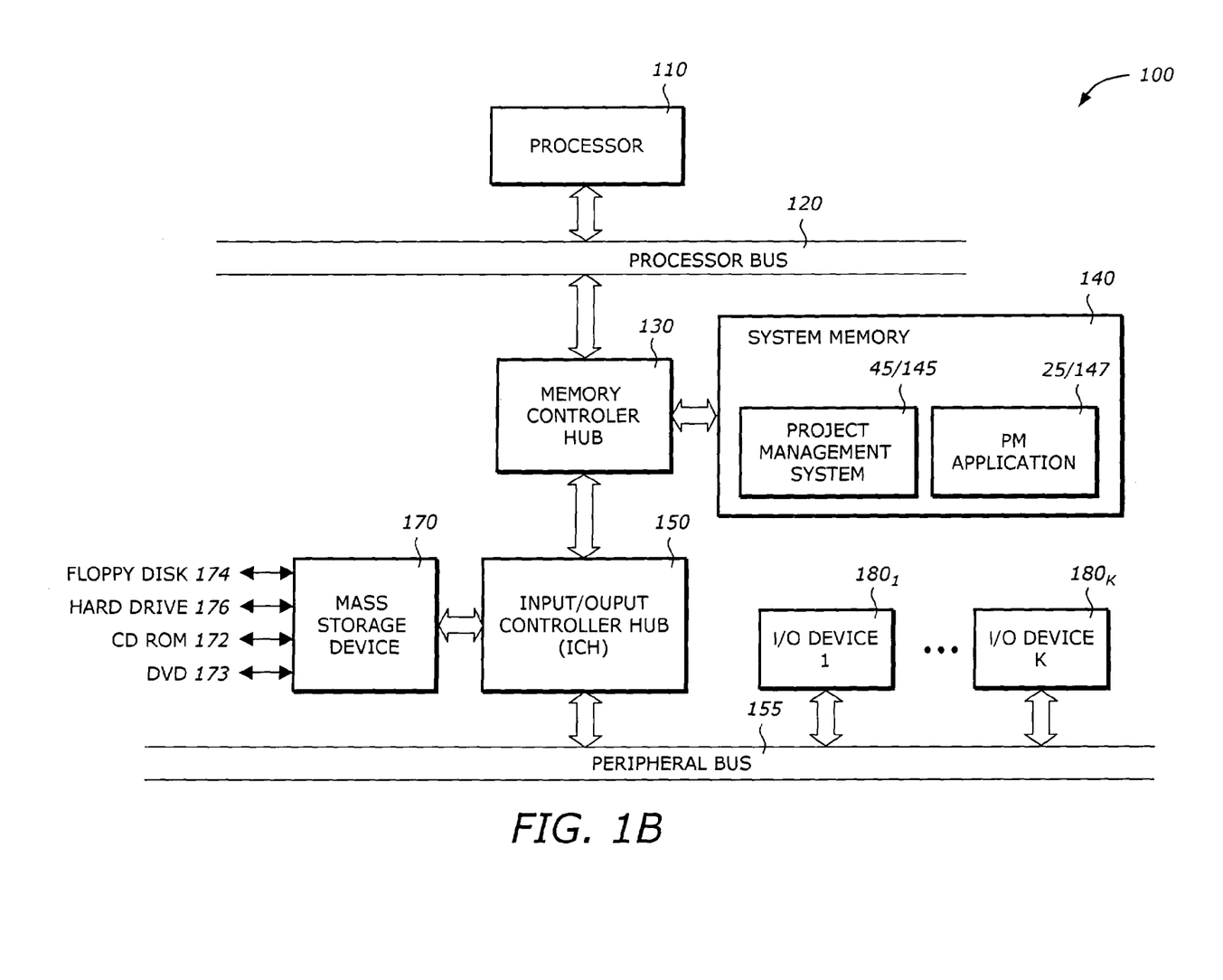
FIG. 1B is a diagram illustrating a computer system according to one embodiment of the invention.

FIG. 1B is a diagram illustrating a computer system 100 in which one embodiment of the invention can be practiced. The system 100 includes a processor 110, a processor bus 120, a memory control hub (MCH) 130, a system memory 140, an input/output control hub (ICH) 150, a peripheral bus 155, a mass storage device 170, and input/output devices $180_1$ to $180_K$. Note that the system 100 may include more or less elements than these elements.

The processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The processor bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. The MCH 130 interfaces to the peripheral bus 155. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory may include program code or code segments implementing one embodiment of the invention. The system memory includes a project management system 45 or application 25. Any one of the elements of the project management system 45 or application 25 may be implemented by hardware, software, firmware, microcode, or any combination thereof. The system memory 140 may also include other programs or data which are not shown, such as an operating system. The project management system 45 or application 25 may implement all or part of the project management functions. The project management system 45 or application 25 may also simulate the project management functions. The project management system 45 or application 25 contains instructions that, when executed by the processor 110, causes the processor to perform the tasks or operations as described in the following.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 155, processor interface, interrupt controller, direct memory access (DMA) controller, power management logic, timer, system management bus (SMBus), universal serial bus (USB) interface, mass storage interface, low pin count (LPC) interface, etc.

The mass storage device 170 stores archive information such as code, programs, files, data, databases, applications, and operating systems. The mass storage device 170 may include compact disk (CD) ROM 172, a digital video/versatile disc (DVD) 173, floppy drive 174, and hard drive 176, and any other magnetic or optic storage devices such as tape drive, tape library, redundant arrays of inexpensive disks (RAIDs), etc. The mass storage device 170 provides a mechanism to read machine-accessible media. The machine-accessible media may contain computer readable program code to perform tasks as described in the following.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), network card such as Institute of Electrical and Electronics Engineers (IEEE) 802.3, IEEE-1394, IEEE-802.11x, Bluetooth, and any other peripheral controllers.

Elements of one embodiment of the invention may be implemented by hardware, firmware, software or any combination thereof. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, ROM, EROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Figure 2:
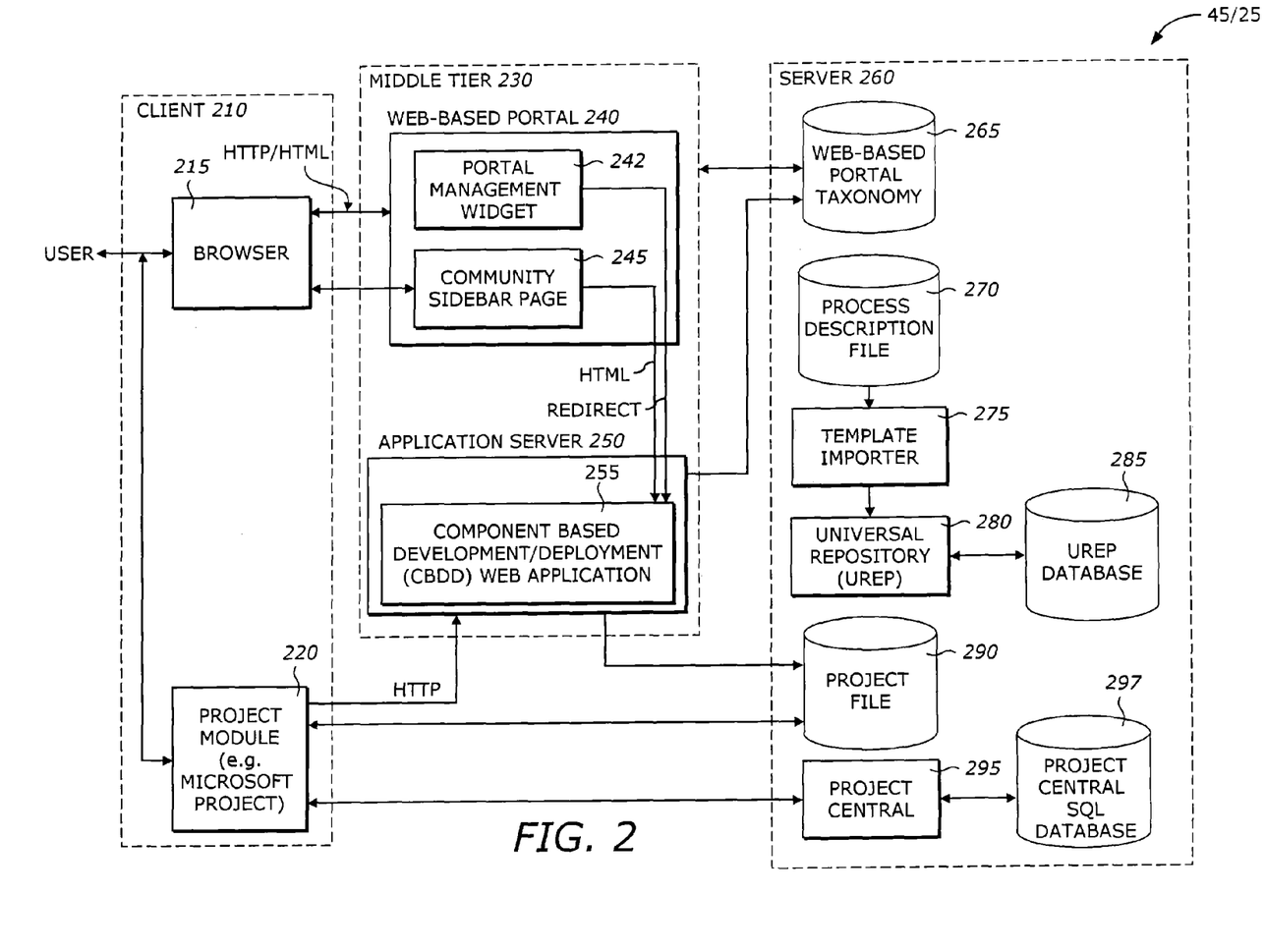
FIG. 2 is a diagram illustrating a project management system/application according to one embodiment of the invention.

FIG. 2 is a diagram illustrating a project management system/application 25/45 according to one embodiment of the invention. The project management system/application 25/45 includes a client 210, a middle tier 230, and a server 260.

The client 210 includes an application accessible to the user or the project team member. The application is typically installed or located at the user's computer system. The client 210 includes a browser 215 and a project module 220. The browser 215 is a Web-based browser that allows the user to navigate the project management system to carry out tasks for project management. The project module 220 is a software or an application designed to provide basic tools for management of projects or workflow. The project module 220 may have any of the following features: creating reports, charts, schedules, calendars, sending and receiving information on project task status and assignment; viewing, editing, and grouping resources; integrating spreadsheets, databases; tracking project progress; etc. In one embodiment, the project module 220 is the Microsoft Project Central, Project 2000 software package.

The middle tier 230 may be implemented at the client 210 or the server 260 and includes a web-based portal 240 and an application server 250. The web-based portal 240 provides tools to manage links for navigation in a Web-based environment. The web-based portal 240 includes a portal management widget 242 and a community sidebar page 245. The portal management widget 242 is in essence a Hyper-Text Markup Language (HTML) file that contains HTML code. It is a set of related links that can appear on a user's portal page and provides links to other components, such as project frame set page when used for portal maintenance, and new project web wizard for initial project configuration. The community sidebar page 245 provides links to the project module database, and to the project frame set page when used for on-going project management. The application server 250 is an enterprise software that provides application infrastructure for the overall project management system such as CBDD. It serves as an interface layer between the user interface and the system databases and/or other server components. In one embodiment, the application server 250 is the WebLogic server which provides basic application server functions and services such as transaction management, security, messaging, database connectivity, resource pooling, etc. Typically, the application server 250 is fully compliant with the industry standard, such as Java 2 Enterprise Edition (J2EE) version 1.3, and is portable across various hardware and operating systems including UNIX, Linux, Windows, etc. The application server 250 supports programming standards to build an application infrastructure, including eXtensible Markup Language (XML), Simple Object Access Protocol (SOAP), Web Services Definition Language (WSDL), etc. The CBDD web application 255 uses the services of the application server 250 to provide a user interface and application logic for the present invention.

The server 260 provides functions at the server side. The server 260 includes a web-based portal taxonomy 265, a process description file 270, a template importer 275, a universal repository (UREP) 280, a UREP database 285, a project file 290, a central project module 295, and a project database 297. The web-based portal taxonomy 265 provides tools to create or publish documents to any topic of the newly generated taxonomy. The taxonomy generation may include generation of elements for various phases in a project such as requirement phase, feasibility phase, design phase, development phase, integration and qualification phase, and support phase. The process description file 270 includes files that are created by user to describe elements of the project. The template importer 275 is a utility to import a process template into the UREP 280 and create the corresponding objects and references needed to represent that process in the UREP 280. The template importer 275 is also used to import global data which are not project-related. Examples of global data include module level notifications and global access control functions. In one embodiment, the process template data is expressed as a XML file. The UREP 280 is a metadata database, a data store, or repository information model that defines the information that can be stored in the repository database 285. It may also identify the services, tool, and technology models supported by the system. The UREP database 285 is a metadata database that stores the repository information. Note that the term repository refers to any type of data store, storage, database, etc.

The project file 290 is a directory that saves generated project files. The project file is used to manage tasks, assignments, and schedules inside the project module 220. The central project 295 is a project management software module that is located at the server. The project central database 297 stores files, information, and data used by the central project 295. In one embodiment, the central project 295 is the Microsoft Project Central.

Figure 3:
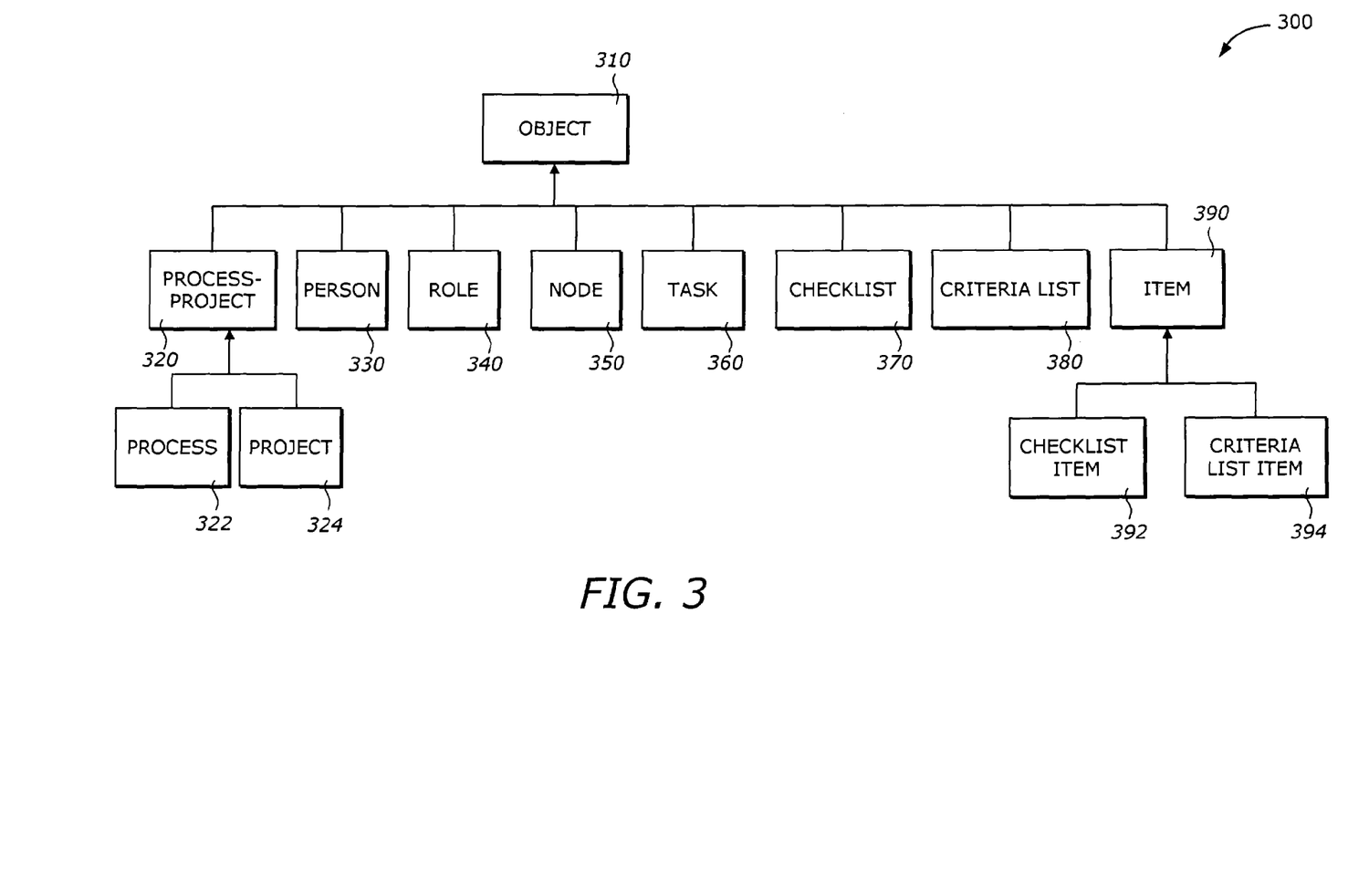
FIG. 3 is a diagram illustrating a hierarchical project model according to one embodiment of the invention.

FIG. 3 is a diagram illustrating a hierarchical project model 300 according to one embodiment of the invention. The hierarchical project model 300 is a CBDD repository model that stores the process and project configurations. It includes several supertypes or types defined for the project management. In one embodiment, these types include a supertype Object 310, a type Process-Project 320, a type Person 330, a type Role 340, a type Node 350, a type Task 360, a type CheckList 370, a type CriteriaList 380, and a type Item 390. The type Process-Project 320 has a subtype Process 322 and a subtype Project 324. The type Item 390 has a subtype CheckList Item 392 and a subtype CriteriaList Item 394.

The supertype Object 310 allows common features, such as name, to be defined once for its subtypes.

The type Process-Project 320 is a supertype of the Process 322 and the Project 324. It allows common features of these types to be defined once. The Process 322 represents a complete or entire process used to run a project. Usually, a process is defined once and is used for many projects. The Project 324 models a real-world project that the team is working on. Person 330 represents a person, a team member, a user, a project member, or an entity who is assigned to carry out a project task. The Role 340 models similar jobs or roles performed by various project members. Examples of roles are programmer, technician, project manager, draftsman, etc. The Node 350 represents a phase, a category, or an activity of a project. The Task 360 represents the actual work items that project members carry out. Examples of tasks are installation of test routines, verification of algorithm correctness, optimization of codes, etc. Tasks typically belong to a particular phase represented by the Node 350. CheckList 370 provides for lists of items that are checked off as a project is completed. The CriteriaList 380 provides for lists of entry and exit criteria that are accomplished before a project transitions from one phase to another phase. The Item 390 provides a supertype for the CheckList Item 392 and the CriteriaList Item 394. It allows common features of these types to be defined once. The CheckList Item 392 represents the individual checklist items contained in a checklist. The CriteriaList Item 394 represents the individual criteria contained in a criteria list. The criteria may include entry and exit criteria.

The UREP supports multiple repository sessions, but all database calls in an application are made from the same thread. When there are many instances of the repository component, each representing a repository session, performing database calls in the same thread may degrade performance. The invention creates a separate process for each repository session, therefore, increasing performance. Each process is represented by a virtual machine. In addition, the invention uses Java RMI to access the object-oriented data store in the UREP database. Using the RMI allows the connection between the client and the server to remain open as long as the client needs it, as opposed to the stateless connections used by XML remote procedure call (RPC) and SOAP. Note that the technique in the present invention may be applied for any data-store or repository having any application, not just project management.

Figure 4:
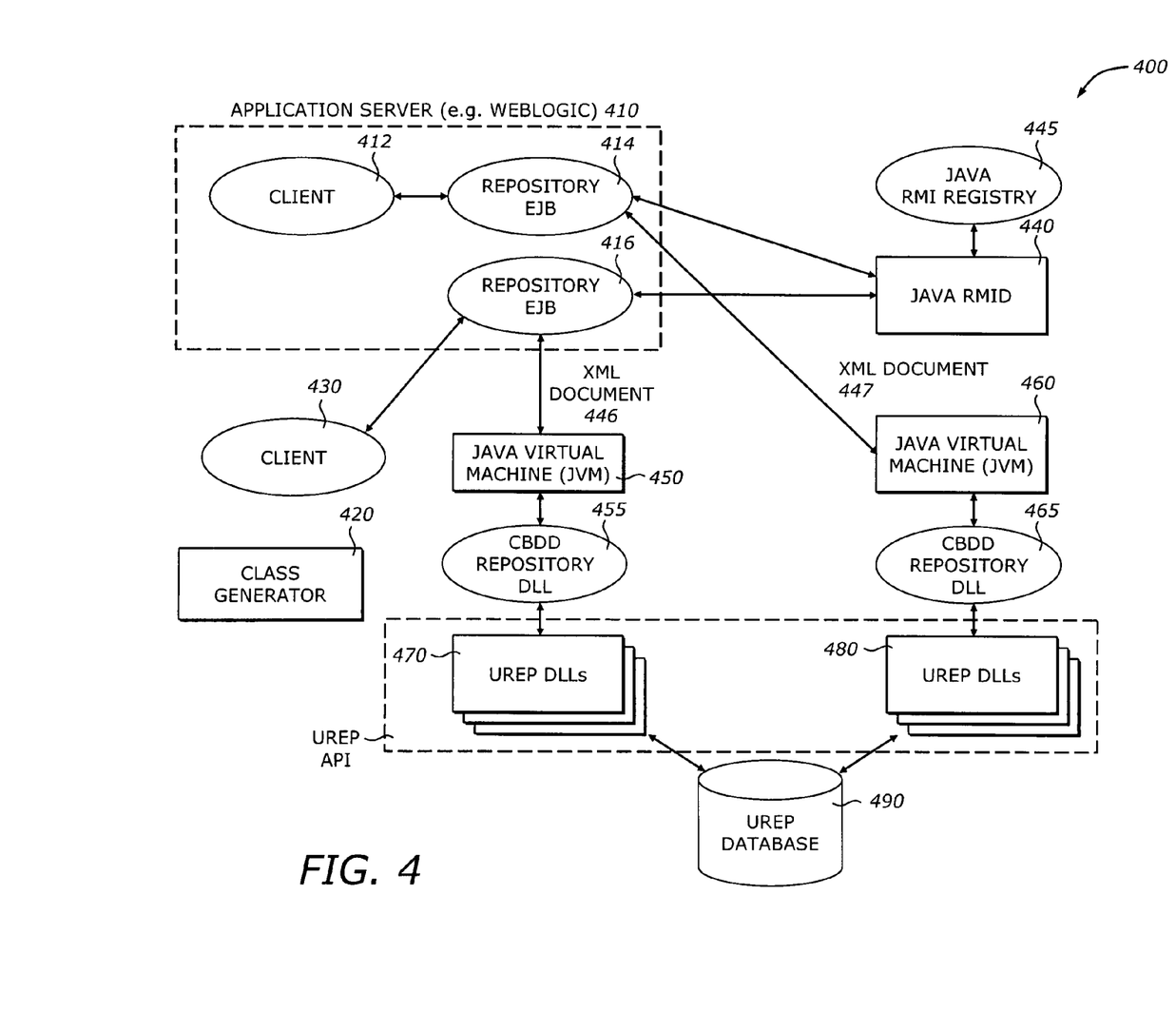
FIG. 4 is a diagram illustrating a repository interface architecture according to one embodiment of the invention.

FIG. 4 is a diagram illustrating a repository interface architecture 400 according to one embodiment of the invention. The architecture 400 includes an application server 410, a class generator 420, a client 430, a Remote Method Invocation (RMI) registry 445, a RMI daemon 440, virtual machines 450 and 460, CBDD repository dynamic link library (DLL) functions 455 and 465, and UREP DLL functions 470 and 480, and UREP database 490.

The application server (e.g., WebLogic) 410 includes a client 412, and repository components 414 and 416. The clients 412 and 430 interact with the repository components 414 and 416, respectively, to make connections to the UREP database and request operations to be performed. Once a client creates a connection to the repository on the server, it remains open and available to that client until the client closes it. The connection between the client and the repository is stateful. The repository components 414 and 416 are responsible for initializing and removing the RMI connection to the RMI daemon 440. The RMI registry 445 contains registered information on the RMI layer class so that clients can locate it. Each repository component represents a repository session. In one embodiment, each repository components is implemented as a stateful session Enterprise Java Bean (EJB). Each of the repository components 414 and 416 is passed to the constructors of the Java classes that represent calls on the repository.

The class generator 420 generates the Java and C++ classes used in the repository API. It reads the CBDD model and generates the files for the repository API. The class generator 420 reads from an XML file that contains the model as described in the Unified Modeling Language (UML) format. Based on the classes, attributes, and operations in the model, the class generator 420 produces the files needed for the repository API.

The virtual machines 450 and 460 provide processes for access to the UREP database. In one embodiment, the virtual machines 450 and 460 are implemented by Java Virtual Machine (JVM). The virtual machines 450 and 460 communicate with the repository components 416 and 414 via documents 446 and 447, respectively. The CBDD repository DLL functions 455 and 465 are used to call the UREP DLLs 470 and 480, respectively. In one embodiment, the CBDD repository DLL and the UREP DLL functions 455, 465, 470, and 480 are written in object-oriented language such as C++.

The repository API consists of a set of classes that allow Java clients to call the repository. Most of the classes require the client to identify the object on which the function is called. In one embodiment, the classes corresponding to requested operations are generated for the types in the CBDD model. Examples of the requested operations are: an add process operation, an add published document operation, a construct operation, a flush process operation, a flush published document operation, a get attribute operation, a get personnel operation, a get personnel by role function, a get process operation, a get published document operation, a remove process operation, a remove published document operation, a set attribute operation, a transaction handling operation, a repository opening operation, a repository closing operation, a trace level setting operation, an object deleting operation, and a custom operation.

Figure 5:
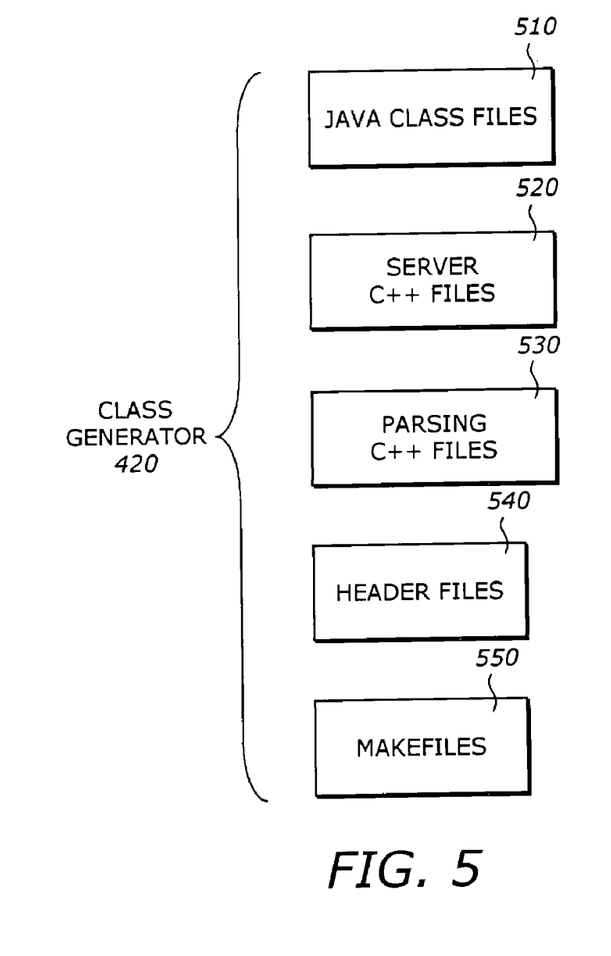
FIG. 5 is a diagram illustrating files generated by a class generator according to one embodiment of the invention.

FIG. 5 is a diagram illustrating files generated by the class generator 420 according to one embodiment of the invention. The class generator creates Java class files 510, server C++ files 520, parsing C++ files 530, header files 540, and makefiles 550. Other files may also be created.

The Java class files 510 are used by the Java clients. Each Java class represents a different call to the repository. There is also an internal class that is used in parsing the return value of the call. The server C++ files 520 are for server side functions. Each client function has a corresponding server side function that parses any input XML document, creates the parameter objects, calls the repository, and returns any result in XML. The parsing C++ files 530 are for parsing the input XML. An event handler class is used to get the parameter values from the input XML. The header files 540 are the header files for the C++ files. The makefiles 550 are makefiles to compile the Java classes, create and compile the RMI stub classes, jar the results together, compile the server side classes, and create the repository DLL functions.

Figure 6:
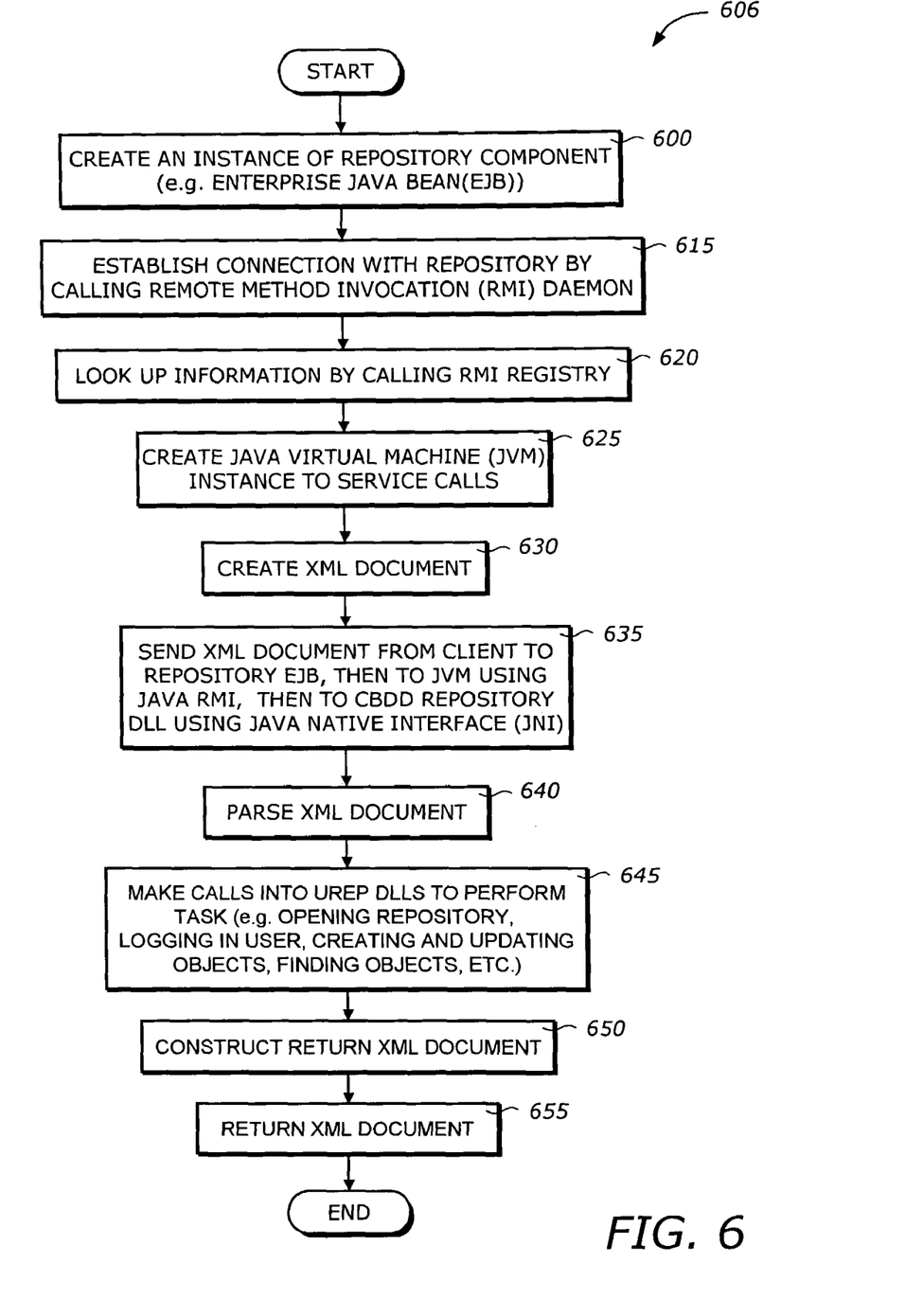
FIG. 6 is a flowchart illustrating a process to interface to a repository according to one embodiment of the invention.

FIG. 6 is a flowchart illustrating a process 600 to interface to a repository according to one embodiment of the invention.

Upon START, the process 600 creates an instance of a repository component such as a repository EJB (Block 610). Then, the process 600 establishes a connection with the UREP database by calling the RMI daemon (Block 615). Next, the process 600 looks up the information by calling the RMI registry (Block 620).

Then, the process 600 creates a virtual machine instance to service the calls (Block 625). In one embodiment, the virtual machine is a Java Virtual Machine (JVM). Next, the process 600 creates an XML document that contains the parameters for the requested operation (Block 630).

Then, the process 600 begins communicating with the repository API to perform the requested operation based on parameters passed from the client via the connection. This may be performed by sending the XML document from the client to the repository component (e.g., EJB), then to the JVM using Java RMI, then to the CBDD repository DLL using Java Native Interface (JNI) calls (Block 635). Next, the process 600 parses the XML document to obtain the parameters for the requested operation (Block 640). Then, the process 600 makes calls to the UREP DLLs in the UREP API to perform the tasks (Block 645). Examples of these operations or tasks are opening the repository, logging in user, creating and updating objects, and finding objects, etc.

After the operation is performed, the process 600 constructs the return XML document to the client to report status or returning values (Block 650). Next, the process 600 returns the XML document to the client in the reverse path from the above path (Block 655) and is then terminated.

Figure 7:
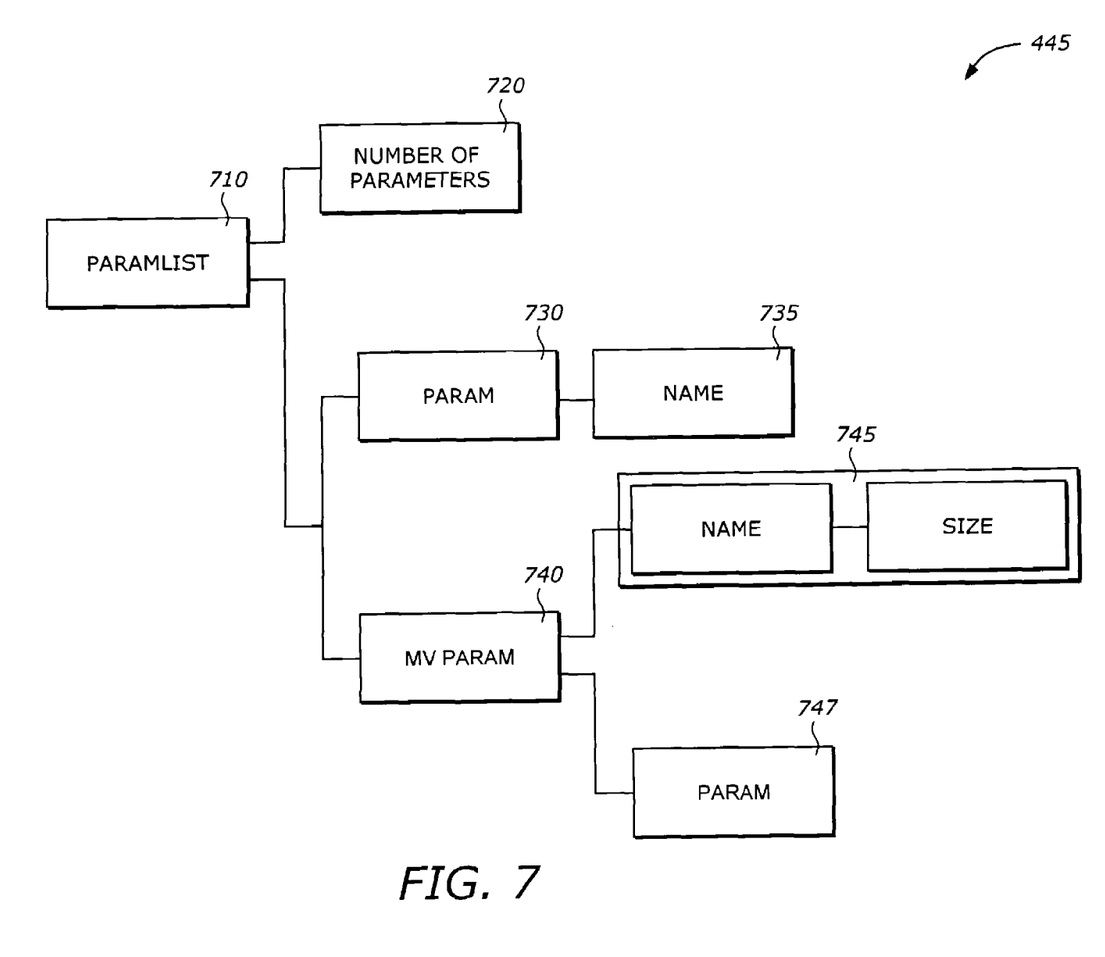
FIG. 7 is a diagram illustrating a parameter type definition in the document according to one embodiment of the invention.

FIG. 7 is a diagram illustrating a parameter type definition in the XML document 445 according to one embodiment of the invention. The parameter type definition includes a root element ParamList 710. The ParamList 710 has an optional attribute 720 for the number of parameters and an element Param 730 and an element MV Param 740. The Param 730 represents a single valued parameter. It has a required name attribute 735. The MV Param 740 represents a multi-valued parameter. It consists of zero or more Param elements such as a Param element 747. It has a name and size attribute 745.

Figure 8:
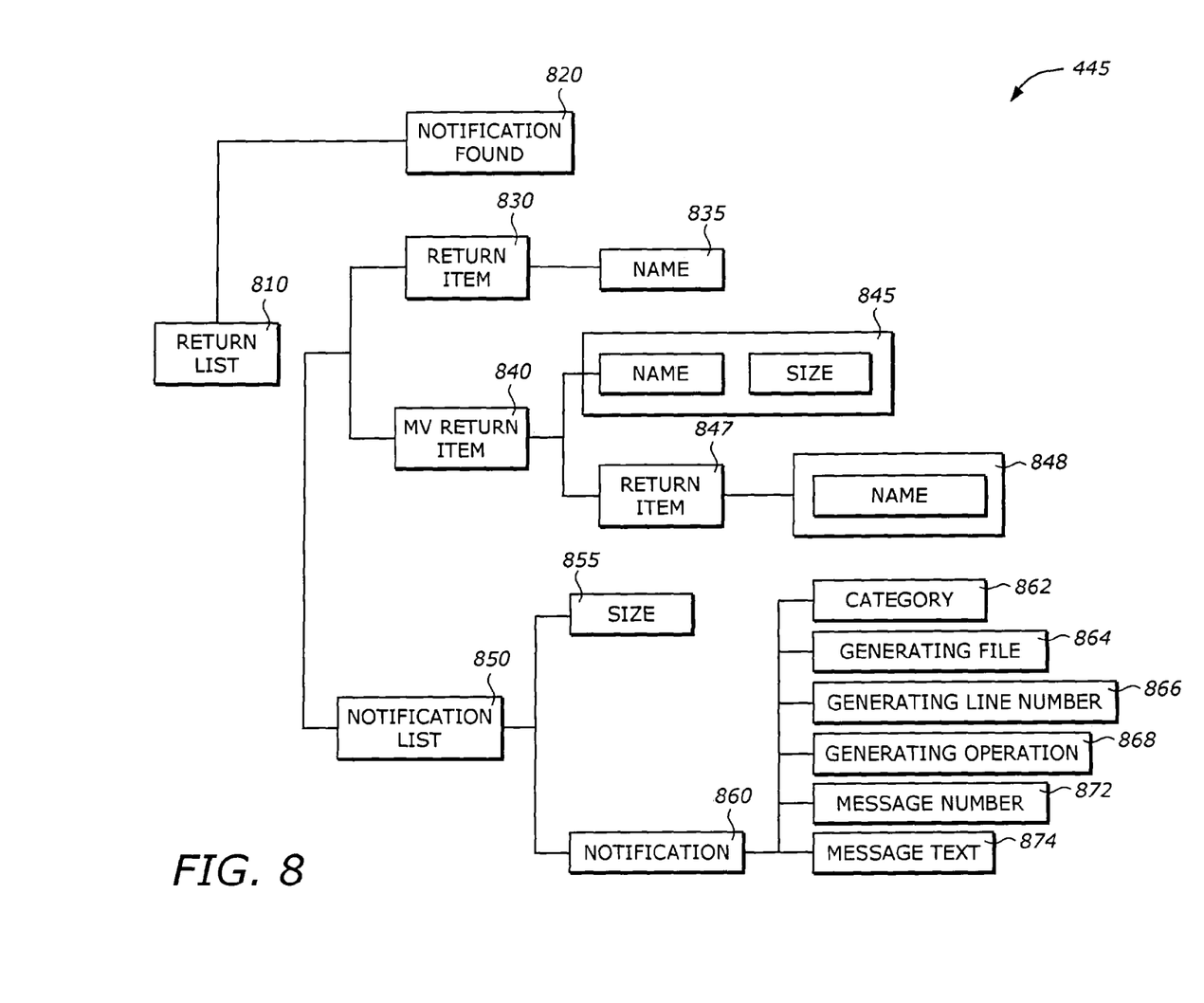
FIG. 8 is a diagram illustrating a return type definition in the document according to one embodiment of the invention.

FIG. 8 is a diagram illustrating a return type definition in the document according to one embodiment of the invention. The return type definition includes a root element RetunList 810. It has an attribute Notification Found 820. When this attribute is true, then notifications were generated during UREP processing. Other elements include a Return Item 830, a MV Return Item 840, and a Notification List 850.

The Return Item 830 represents a single-valued return value. Its value is text. It has a name attribute 835. The MV Return Item 840 represents a multi-valued return value. It has a name and size attribute 845. It consists of zero or more Return Items (e.g., Return Item 847 having a name 848). The Notification List 850 represents a list of notifications. If no notifications were generated during the repository calls, this element is not present. It has a size attribute 855 and a Notification element 860. The Notification 860 contains the notification from the UREP. It contains elements corresponding to the various attributes of a UREP notification, including a category 862, a generating file 864, a generating line number 866, a generating operation 868, a message number 872, and a message text 874.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A computer implemented method comprising:
  establishing a stateful connection between a client and a repository database having a repository application programming interface (API), the repository database containing objects, the connection being established by;
    creating an instance of a repository component;
    calling a remote method invocation (RMI) daemon;
    calling a RMI registry to obtain connection information; and
    creating a virtual machine to service connection calls using the connection information;
  communicating with the repository API to perform an operation based on parameters passed from the client via the connection; and
  returning a return value associated with the operation to the client.

2. The method of claim 1 wherein communicating comprises:
  sending a document containing the parameters from the client to a repository dynamic link library (DLL) function;
  parsing the document using the repository DLL function; and
  calling a repository API function in the repository API to perform the operation.

3. The method of claim 2 wherein sending the document comprises:
  sending the document from the client to the repository component;
  sending the document from the repository component to the virtual machine using a RMI; and
  sending the document from the virtual machine to a repository DLL function.

4. The method of claim 1 further comprises:
  generating classes for the repository API.

5. The method of claim 4 wherein generating classes comprises:
  parsing an XML document representing a model;
  generating Java class files from the model;
  generating C++ class files from the model; and
  generating make files.

6. The method of claim 1 wherein creating an instance of a repository component comprises:
  creating an instance of a repository Enterprise Java Bean (EJB).

7. The method of claim 1 wherein creating a virtual machine comprises:
  creating a Java virtual machine (JVM).

8. The method of claim 2 wherein sending a document comprises:

sending an eXtensible Markup Language (XML) document, the XML document including at least one of a parameter list element and a return list element, the parameter list element including at least one of a single-valued parameter and a multi-valued parameter, the return list element including at least one of a single-valued return item, a multi-valued return item, and a notification list element.

9. The method of claim 1 wherein establishing comprises:
establishing the stateful connection between the client and the repository database containing the objects related to a project management process.

10. The method of claim 3 wherein sending the document from the virtual machine to a repository DLL function comprises:
sending the document from the virtual machine to a repository DLL function using a Java Native Interface (JNI) call.

11. An article of manufacture comprising:
a machine-accessible storage medium including data that, when accessed by a machine, causes the machine to perform operations comprising:
establishing a stateful connection between a client and a repository database having a repository application programming interface (API), the repository database containing objects, the connection being established by;
creating an instance of a repository component;
calling a remote method invocation (RMI) daemon;
calling a RMI registry to obtain connection information; and
creating a virtual machine to service connection calls using the connection information;
communicating with the repository API to perform an operation based on parameters passed from the client via the connection; and
returning a return value associated with the operation to the client.

12. The article of manufacture of claim 11 wherein the data causing the machine to perform communicating comprises data that, when accessed by the machine, causes the machine to perform operations comprising:
sending a document containing the parameters from the client to a repository dynamic link library (DLL) function;
parsing the document using the repository DLL function; and
calling a repository API function in the repository API to perform the operation.

13. The article of manufacture of claim 12 wherein the data causing the machine to perform sending the document comprises data that, when accessed by the machine, causes the machine to perform operations comprising:
sending the document from the client to the repository component;
sending the document from the repository component to the virtual machine using a RMI; and
sending the document from the virtual machine to a repository DLL function.

14. The article of manufacture of claim 12 wherein the data causing the machine to perform calling the repository API function comprises data that, when accessed by the machine, causes the machine to perform operations comprising:
generating class files for use by the repository API function.

15. The article of manufacture of claim 14 wherein the data causing the machine to perform calling the repository API function further comprises data that, when accessed by the machine, causes the machine to perform operations comprising:
parsing the generated class files.

16. The article of manufacture of claim 11 wherein the data causing the machine to perform creating an instance of a repository component comprises data that, when accessed by the machine, causes the machine to perform operations comprising:
creating an instance of a repository Enterprise Java Bean (EJB).

17. The article of manufacture of claim 11 wherein the data causing the machine to perform creating a virtual machine comprises data that, when accessed by the machine, causes the machine to perform operations comprising:
creating a Java virtual machine (JVM).

18. The article of manufacture of claim 12 wherein the data causing the machine to perform sending a document comprises data that, when accessed by the machine, causes the machine to perform operations comprising:
sending an eXtensible Markup Language (XML) document, the XML document including at least one of a parameter list element and a return list element, the parameter list element including at least one of a single-valued parameter and a multi-valued parameter, the return list element including at least one of a single-valued return item, a multi-valued return item, and a notification list element.

19. The article of manufacture of claim 13 wherein the data causing the machine to perform establishing comprises data that, when accessed by the machine, causes the machine to perform operations comprising:
establishing the stateful connection between the client and the repository database containing the objects related to a project management process.

20. The article of manufacture of claim 13 wherein the data causing the machine to perform sending the document from the virtual machine to a repository DLL function comprises data that, when accessed by the machine, causes the machine to perform operations comprising:
sending the document from the virtual machine to a repository DLL function using a Java Native Interface (JNI) call.

21. A system comprising:
a processor; and
a memory coupled to the processor, the memory containing instructions that, when executed by the processor, causes the processor to:
establish a stateful connection between a client and a repository database having a repository application programming interface (API), the repository database containing objects, the connection being established by causing the processor to:
create an instance of a repository component;
call a remote method invocation (RMI) daemon;
call a RMI registry to obtain connection information; and
create a virtual machine to service connection calls using the connection information;
communicate with the repository API to perform an operation based on parameters passed from the client via the connection, and
return a return value associated with the operation to the client.

22. The system of claim 21 wherein the instructions causing the processor to communicate comprises instructions that, when executed by the processor, causes the processor to:
send a document containing the parameters from the client to a repository dynamic link library (DLL) function;
parse the document using the repository DLL function; and
call a repository API function in the repository API to perform the operation.

23. The system of claim 22 wherein the instructions causing the processor to send the document comprises instructions that, when executed by the processor, causes the processor to:
  send the document from the client to the repository component;
  send the document from the repository component to the virtual machine using a RMI; and
  send the document from the virtual machine to a repository DLL function.

24. The system of claim 22 wherein the instructions causing the processor to call the repository API function comprises instructions that, when executed by the processor, causes the processor to:
  generate class files for use by the repository API function.

25. The system of claim 22 wherein the instructions causing the processor to call the repository API function further comprises instructions that, when executed by the processor, causes the processor to:
  parse the generated class files.

26. The system of claim 21 wherein the instructions causing the processor to create an instance of a repository component comprises instructions that, when executed by the processor, causes the processor to:
  create an instance of a repository Enterprise Java Bean (EJB).

27. The system of claim 21 wherein the instructions causing the processor to create a virtual machine comprises instructions that, when executed by the processor, causes the processor to:
  create a Java virtual machine (JVM).

28. The system of claim 22 wherein the instructions causing the processor to send a document comprises instructions that, when executed by the processor, causes the processor to:
  send an eXtensible Markup Language (XML) document, the XML document including at least one of a parameter list element and a return list element, the parameter list element including at least one of a single-valued parameter and a multi-valued parameter, the return list element including at least one of a single-valued return item, a multi-valued return item, and a notification list element.

29. The system of claim 23 wherein the instructions causing the processor to establish comprises instructions that, when executed by the processor, causes the processor to:
  establish the stateful connection between the client and the repository database containing the objects related to a project management process.

30. The system of claim 23 wherein the instructions causing the processor to send the document comprises instructions that, when executed by the processor, causes the processor to:
  send the document from the virtual machine to a repository DLL function using a Java Native Interface (JNI) call.

* * * * *